April 1, 1952  J. F. ZALESKI  2,591,329
MICROWAVE MEASURING INSTRUMENT
Filed April 8, 1949  2 SHEETS—SHEET 1

Inventor
JOHN F. ZALESKI
By
H. L. Mackey
Attorney

April 1, 1952  J. F. ZALESKI  2,591,329
MICROWAVE MEASURING INSTRUMENT
Filed April 8, 1949  2 SHEETS—SHEET 2

Inventor
JOHN F. ZALESKI

Patented Apr. 1, 1952

2,591,329

UNITED STATES PATENT OFFICE 2,591,329

MICROWAVE MEASURING INSTRUMENT

John F. Zaleski, Queens Village, N. Y., assignor to General Precision Laboratory Incorporated, a corporation of New York Application April 8, 1949, Serial No. 86,293

2 Claims. (Cl. 175—183)

This invention pertains to an instrument for measuring microwave standing wave ratios.

In measuring microwave voltage standing wave ratios it has been necessary heretofore to employ a voltage standing wave ratio meter having a probe or antenna projecting into the interior of a rectangular hollow microwave guide. It has been necessary to arrange this probe for longitudinal movement in the guide, requiring the provision of a narrow slit in the center line of one of the broad faces of the guide and of a sliding carriage with micrometer adjustment to move the probe in the slot. The use of such a sliding probe has permitted the finding of the nodes and antinodes of stationary waves which may exist within the guide, but has required a complicated, precise and expensive slide mechanism. The instant invention has for its purpose the provision of a simpler and more economical instrumentality which nevertheless accomplishes all of the results heretofore requiring the use of the more expensive mechanisms.

It is well known that the length of a microwave of a particular frequency which is traveling within a hollow wave guide is greater than its wavelength in free space. The wavelength within the guide, denoted by $\lambda_g$, depends both on the frequency of the electrical energy and on the physical width dimension of the guide. It has been found that the wavelength within the guide can also be reduced by the introduction of a thin, double tapered fin of dielectric material or metal longitudinally along the center line of one broad side of a rectangular guide, or along the corresponding longitudinal element of a circular guide. The same effect also occurs when such a fin is introduced into a slot in a coaxial cable or a metallic fin is introduced into a slot in a dielectric guide. It has also been determined that a relatively small amount of protrusion of the fin within the guide effects a large change in $\lambda_g$. As microwaves pass through a wave guide containing such a fin they are bunched in space and retarded in time, so that the time of arrival of a particular loop or node at any point beyond the section of wave guide will be later than in the absence of the fin. In other words, the time phase of the wave has been shifted. Tests indicate that such a phase shift is accompanied by little if any loss of potential or energy.

It is a purpose of the present invention, therefore, to provide a mechanism in which this phenomenon is utilized for measuring standing wave ratios.

This invention will be more readily understood from the following detailed description, considered together with the attached drawings, in which.

Figure 1:
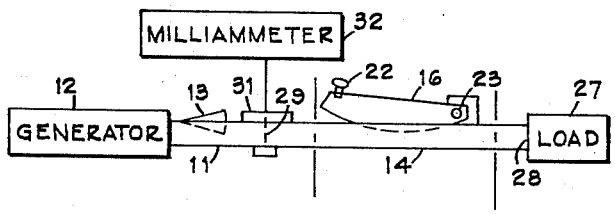
Figure 1 illustrates a standing wave ratio meter employing a phase retarder.

In Fig. 1 a rectangular hollow wave guide 11 is diagrammatically shown connected to a generator 12 of microwave energy of a particular frequency, of which substantially only the fundamental $TE_{1,0}$ mode will be transmitted by the guide because the guide dimensions are chosen, as is usual in the art, so that all modes but that one are greatly attenuated and very little if any of the other modes are transmitted. The generator is decoupled by a flap attenuator 13 sufficiently to prevent reaction on the generator by reflected waves. The microwaves are conducted by the guide through a section 14 containing a slot extending along the center line of one of the broad sides of the guide and having a fin 16 whose plane is parallel to the direction of the E vector and which projects through the slot into the interior of the guide.

Figures 2, 3:
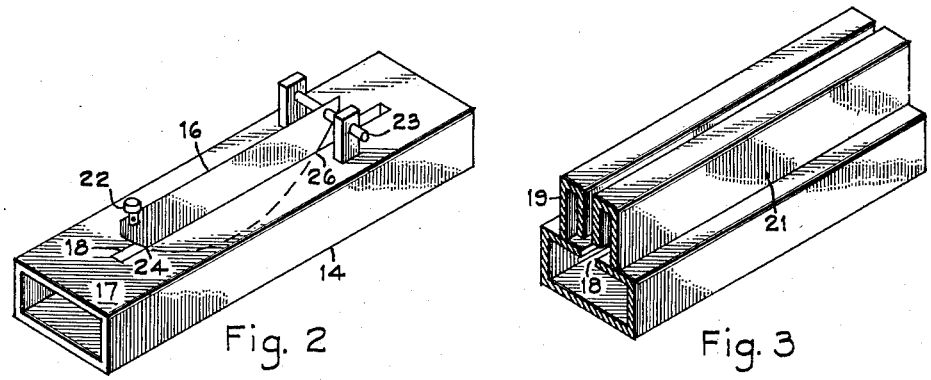
Figure 2 is a more detailed view of a phase retarder used in the mechanism of Fig. 1.
Figure 3 illustrates the manner in which a slot in a wave guide may be guarded by a wave trap.

This section is shown more clearly in Fig. 2. The broad top side 17 of the guide section contains the narrow longitudinal slot 18 extending along the center line of the guide. This slot 18, being made narrow and at a location in the guide wall where the surface currents are minimum, radiates little energy, so has very little effect on the operation of the guide. In order, however, to reduce to the minimum any radiation out of this slot it may be edged along its sides with a wave trap in a manner well known in the art. Such a trap is illustrated in Fig. 3, where the sectioned end of an oblique view clearly shows the slot 18, bordered by two coamings 19 and 21 of folded metal fixed to the outer guide surface parallel to the slot so that their folded legs face toward each other, and so that the length within the fold is one-quarter of the free space wavelength. The outer lips of the slot 18 are high-impedance points for microwaves tending to radiate out of the slot and therefore only a negligible amount of energy will be radiated.

Returning to Fig. 2, a fin 16 is positioned in the slot 18 so that a portion thereof extends into the wave guide section 14. The fin 16 may be made of any convenient shape such that on adjustment of the depth of penetration thereof, the area which extends into the wave guide is greatest near the center of the fin and gradually decreases toward both ends. For example, as illustrated in Fig. 2, the fin 16 may take the form of a segment of a circle. By providing a gradual taper or decrease in area toward each end of the fin, sharp discontinuities and hence reflections at the beginning and end of the intersection of the fin with the wave guide are avoided.

The fin 16 may be composed either of a good metallic conductor such as silver or copper or of a suitable dielectric material such as polystyrene. The fin may be moved in and out of the slot in any convenient manner as by a knob 22 and hinge pin 23, or by any other known means. Likewise the fin 16 may constitute a portion of a circular disc eccentrically mounted on a shaft so that rotation of the shaft and disc varies the area of penetration of the disc in the guide.

It is found that when a fin of either highly conductive or suitable insulating material is inserted longitudinally in the center of the broad side of a rectangular wave guide, microwave energy is retarded as it passes through the guide and that the amount of retardation is representative of both the depth of insertion of the fin and the length of insertion. It is also found that this retardation occurs with little or no loss of energy except in the case where the guide is partly or completely bisected by a conductive vane into two sections, each of which approaches the cutoff dimension for transmission of a specific frequency. This retardation of the microwave energy necessarily produces a bunching of the waves during their passage through the fin section and produces a reduction of the wavelength within that part of the guide, resulting in a lag in the time phase of waves emerging from the fin section.

In Fig. 2 the fin 16 projects within the guide 14 between the points 24 and 26. Therefore, between these points, microwaves radiated by the generator 12, Fig. 1, and entering the fin section of the guide will be retarded as they pass along the guide between the transverse plane through the point 24 and that through the point 26, and this retardation will have a relation to the amount of insertion of fin area in the slot. The microwave energy which emerges from the phase-retarding section 14 is conducted to the load 27, Fig. 1. This load is assumed to have an input impedance different from the characteristic impedance of the guide, so that an impedance discontinuity exists at the junction 28 between guide and load. This discontinuity reflects a portion of the microwave energy back along the guide section 14 toward the left, and in its passage the microwave energy is again retarded by the effect of the fin 16 upon it. When this microwave energy emerges at the left end of the guide section 14 it has therefore been twice retarded in time by the action of the fin 16, once when transmitted toward the right and once when reflected toward the left, the total amount of retardation being a function of the amount of insertion of the fin 16 and of its length.

In the guide 11 there is inserted an antenna or probe 29 which is affected by the potential of the microwaves. The probe is connected to a crystal rectifier 31 which in turn is electrically connected to an electrical indicating instrument such as milliammeter 32. A portion of the microwave energy passing the location of the probe is picked up thereby, is rectified and the rectified current representative of the microwave potential at the probe is observable on the milliammeter 32. When reflected waves are present they form standing waves by cooperation with the transmitted waves, so that if the probe 29 could be moved longitudinally along the guide its indication would vary in accordance with the part, or space phase, of the standing wave in which it is immersed. Likewise, if instead of moving the probe through the stationary or standing wave the probe is maintained stationary and the standing waves are shifted longitudinally past the probe a similar indication is obtained. This latter operation is what occurs when the fin 16 is raised or lowered. The lowering and raising of the fin 16 retards the waves passing through the section 14 to a greater or lesser extent so that the standing nodes and antinodes existing in the guide 11 are moved toward the right a greater or lesser distance. By thus moving these nodes and antinodes by an amount equal to 180 electrical degrees past the probe 29 by making the area of the fin which is within the guide of suitable size, preferably several wavelengths in length, at least one node and one antinode will be moved past the probe. The readings of the milliammeter 32 will vary between minimum and maximum values, and the ratio of the latter to the former is commonly known as the voltage standing wave ratio, abbreviated VSWR. The apparatus thus constitutes a VSWR meter which has a stationary probe 29, past which the standing waves are moved, instead of having a longitudinally slideable probe which is moved through a stationary half-cycle of standing waves, as has been used in prior devices requiring as a necessary adjunct carefully made and expensive slide adjusting mechanisms.

Figure 4:
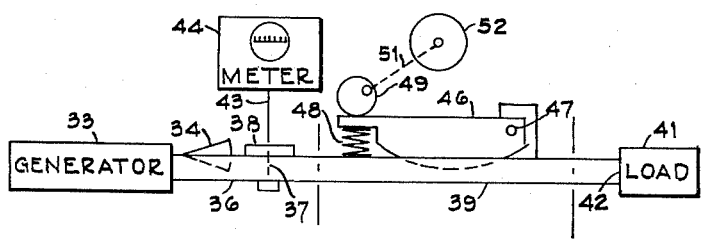
Figure 4 illustrates another form of the invention employing a direct-reading standing wave ratio meter.

Fig. 4 illustrates another embodiment of the invention by which a direct reading of the VSWR may be obtained. A generator 33 transmits microwave energy past a flap attenuator 34 located in a section of hollow rectangular wave guide 36, past a probe 37 and detector 38 and a phase-retarding fin section 39 to an unmatched load 41. The interface 42 between the guide and load reflects microwaves back through the wave guide, forming standing waves, voltage components of which are picked up by the probe 37 and transmitted to its detector 38 in the manner heretofore described. The detector demodulates the microwaves, producing a direct current if the waves are unmodulated, and producing the envelope frequency if the waves are modulated. From the detector the demodulated current is led by conductor 43 to an indicating meter 44 which may be a cathode ray tube having a calibrated linear scale, the deflection of this cathode ray tube representing at any instant the demodulated potential of the microwave energy at the probe 58. The fin 46 in the phase-retarding section of the wave guide is hinged at one end by a pin 47 so that it may move into and out of a slot in the longitudinal center line of one of the broad faces of the guide section 39. A coiled compression spring 48 urges the fin out of the slot and holds it against a cam 49 rotatable by means of a shaft 51, which determines the degree of insertion of the fin. The shaft 51 is rotated at any convenient speed, such as 1740 revolutions per minute, by an electric motor 52. The rotation of the cam 49 with the cooperation of the spring 48 thus oscillates the fin in and out of the slot in the guide. As the fin oscillates, it varies the lengths of the microwaves moving through the section 39 and thereby varies the positions of the standing waves composed of the oppositely-moving wave trains. The nodes and loops near the probe 37 are thereby moved back and forth past the probe. The excursions of the fin should be great enough that not less than one-half wavelength is moved back and forth past the probe. The movements of these waves past the probe 37 produce cyclic variations of potential in the probe which are manifested on the cathode ray tube scale as a rapid oscillation of its spot of light along a portion of its scale. This appears to the eye as a stationary line of light due to the persistence of the screen and the retentivity of the eye, and the length of the line is a direct indication of the amount of standing wave ratio voltage present. It therefore is an exceedingly simple means of observing the variation in the VSWR as the match of the load interface 42 is varied, showing by a zero or minimum length the attainment of a perfect or best obtainable match. When a mismatch exists this instrument may also be employed to measure the value of the standing wave ratio by a method which will be described hereinafter.

Figure 5:
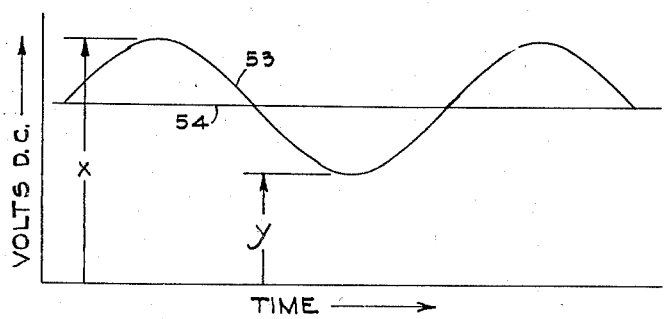
Figure 5 is a graph of the voltage-time relations at the output terminals of the rectifier of Fig. 4.

Fig. 5 depicts the variation of the direct current output voltage of the detector 38 with time due to the motion past the probe 37, Fig. 4, of the "standing" waves, the motion being caused by the oscillation of the fin 39 and the frequency of the modulation envelope 53 being that of the rotation of the cam 49. The ratio of the voltage values X and Y constitutes the voltage standing wave ratio; when the load mismatch becomes a match this ratio becomes unity and the modulation envelope 53 becomes a straight axial line 54.

Figure 6:
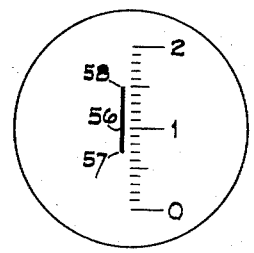
Figure 6 depicts the screen of the cathode ray tube employed in the mechanism of Fig. 4.

Fig. 6 depicts the screen of the cathode ray tube having a linear scale calibrated in any convenient arbitrary units. For measurement of VSWR between 1 and 2, unity should be approximately in the middle of the scale. A line of light 56 is seen when the tube is employed to indicate a potential such as that depicted in Fig. 5, the lower end of the line 54 indicating the value Y, Fig. 5, of the minimum potential and the upper end 58 indicating the value X of the maximum potential. The quotient of the greater by the lesser is obviously the VSWR, and by reading these two points on the scale and dividing, the numerical value of the ratio for the mismatch is secured. This instrument is thus not only an instantaneous indicator of the variation of the VSWR with the variation in the adjustment of a mismatch, but also permits, by a simple arithmetical calculation, the actual value of any mismatch to be measured.

By employment of the flap attenuator 34, Fig. 4, this arithmetical calculation may be eliminated and the instrument becomes a direct-reading VSWR meter. This is done as follows: At any given degree of mismatch, the attenuator 34 is adjusted until the lower end 57 of the line of light 56, Fig. 6, is at unity on the scale; the indication of the upper end 58 is then the value of the VSWR, and may be read directly, eliminating all calculation.

It is obvious that many other forms of mechanism might be employed for oscillating the fin 46 in place of the one described to produce the same result. For instance an eccentric or concentric disc of fin material with one or more segments or pieces of some other shape removed from its edge might be positioned to rotate in the slot of the wave guide so that, as it turns, more or less of its material is cyclically inserted within the guide.

Figure 7:
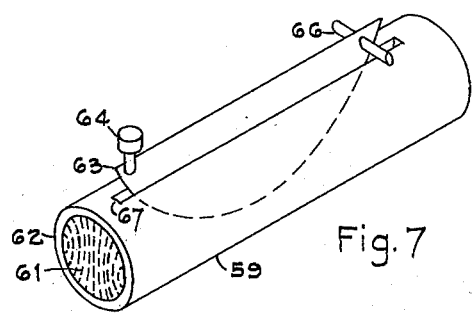
Figures 7, 8 and 9 illustrate the manner in which phase-retarding fins may be associated with different types of wave guides.

While the invention has been described as employing rectangular hollow wave guide, other forms of wave guide may also be used with equal or nearly equal effectiveness. Three of these forms are described below and can readily be incorporated by those skilled in the art in VSWR meters such as described supra. Fig. 7 illustrates the use of round hollow wave guide. A limitation is imposed that the plane of insertion of the fin must be parallel to the diametral E-lines of the field within the guide. In Fig. 7 the round guide 59 is designed for microwave energy oscillating in the normal or $TE_{1,1}$ mode, and the E-lines are represented by lines 61 at the open end 62 of the guide. A fin 63 having a knob 64 at one end for controlling its amount of insertion and a hinge pin 66 at the other is positioned for insertion through a slot 67 in the guide, so that the fin is in a diametral plane. It then will be parallel to the diametral E-lines and will produce phase retardation as described for the rectangular hollow guide.

Figure 8:
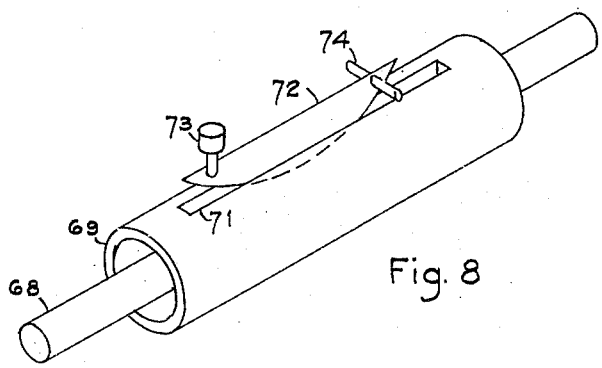

In Fig. 8 there is illustrated the employment of a phase-retarding fin in a coaxial transmission line. The coaxial line consists of a central conductor 68 and outer conductor 69, the latter being provided with a slot 71. A fin 72 is inserted in the slot 71 and the fin is provided with a knob 73 and a hinge pin 74 for controlling the amount of insertion of the fin in the wave guide. The slot 71 may be placed longitudinally in any desired element of the outer conductor. The fin, if metal, may be adjusted to any desired depth except that it must not be permitted to touch the inner conductor while being conductively fastened to the outer one because a short circuit would result. Movement radially of the fin 72 will vary the active fin area and the degree of phase retardation experienced by microwaves passing through the guide.

Figure 9:
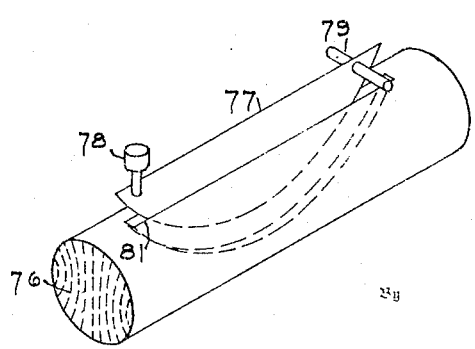

In Fig. 9 is illustrated a round guide made of a rod of a suitable dielectric material such as polystyrene. The dashed lines 76 represent the E-lines of microwaves transmitted in the normal or $TE_{1,1}$ mode. A fin 77 having means represented by the knob 78 and hinge pin 79 for controlling its insertion is positioned in a slot 81. This slot is shaped in the form of a segment of a circle so as to present to microwaves passing through the rod no sudden electrical discontinuities with the greatest depth of the slot slightly less than the diameter of the rod. The outline of the fin 77 is identical with that of the slot and the fin is so positioned as to fit the slot snugly in its position of greatest insertion. To be effective the fin material must be metallic. The fin may be as thin as desired and can be a running fit in the slot, touching the sides without any bad effect. As in the other forms of phase retarders, microwaves passing through this dielectric guide section are retarded by an amount representative of the depth of insertion of the fin, and the function which the retardation is of the insertion depth may be the sine or another function depending on the outline shape of fin chosen.

What is claimed is:

1. A direct-reading microwave standing wave ratio meter comprising, a microwave guide having an input connected to a source of microwave energy and an output connected to a load, a longitudinal opening in said microwave guide in a region of maximum electric field intensity, a fin of sheet material having no appreciable electrical energy dissipative properties inserted in said microwave guide through said longitudinal opening, means for automatically and cyclically varying the degree of insertion of said fin in said microwave guide, an adjustable attenuator inserted in said microwave guide between said input and said fin, a microwave detector coupled to a fixed point on said microwave guide between said attenuator and said fin, and an indicator connected to said detector, said indicator being so calibrated that when the minimum reading thereon is adjusted to a preselected point by adjustment of said attenuator, the maximum reading thereof indicates the voltage standing wave ratio directly.

2. A direct-reading microwave standing wave ratio meter comprising, a microwave guide having an input connected to a source of microwave energy and an output connected to a load, a longitudinal opening in said microwave guide in a region of maximum electric field intensity, a fin of sheet material having no appreciable electrical energy dissipative properties inserted in said microwave guide through said longitudinal opening, means for automatically and cyclically varying the degree of insertion of said fin in said microwave guide, an adjustable attenuator inserted in said microwave guide between said input and said fin, a microwave detector coupled to a fixed point on said microwave guide between said attenuator and said fin, a cathode ray tube having deflecting means connected to the output of said detector whereby the cathode ray beam thereof is deflected by an amount proportional to the output derived from said detector, and scale for said cathode ray tube so calibrated that when the minimum deflection of said cathode ray beam is adjusted to a preselected position by said attenuator, the maximum deflection thereof indicates the voltage standing wave ratio directly.

JOHN F. ZALESKI.

REFERENCES CITED

The following references are of record in the file of this patent:

UNITED STATES PATENTS

| Number | Name | Date |
|---|---|---|
| 2,400,597 | Peterson | May 21, 1946 |
| 2,403,289 | Korman | July 2, 1946 |
| 2,433,368 | Johnson et al. | Dec. 30, 1947 |

FOREIGN PATENTS

| Number | Country | Date |
|---|---|---|
| 591,369 | Great Britain | Aug. 15, 1947 |

OTHER REFERENCES

Kallmann, Electronics, Jan. 1947, pages 96 to 99.